(12) United States Patent
Rudolf et al.

(10) Patent No.: US 8,452,289 B2
(45) Date of Patent: *May 28, 2013

(54) METHOD AND SYSTEM FOR PERFORMING PEER-TO-PEER COMMUNICATION BETWEEN STATIONS WITHIN A BASIC SERVICE SET

(75) Inventors: Marian Rudolf, Montreal (CA); Paul Marinier, Brossard (CA); Vincent Roy, Montreal (CA); Maged M. Zaki, San Diego, CA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/314,410

(22) Filed: Dec. 8, 2011

(65) Prior Publication Data

US 2012/0076049 A1    Mar. 29, 2012

Related U.S. Application Data

(63) Continuation of application No. 11/554,772, filed on Oct. 31, 2006, now Pat. No. 8,077,683.

(60) Provisional application No. 60/733,217, filed on Nov. 3, 2005.

(51) Int. Cl.
*H04W 36/00* (2009.01)

(52) U.S. Cl.
USPC ........... 455/436; 370/388; 370/329; 370/229; 455/434; 709/245

(58) Field of Classification Search
USPC .................. 370/338, 328, 311, 329, 468, 331, 370/241, 395.21, 395.43, 401, 229; 455/452.2, 455/343.2, 438, 436, 434; 709/225, 245
See application file for complete search history.

(56) References Cited

U.S. PATENT DOCUMENTS

| 5,819,177 | A  | 10/1998 | Vucetic et al. |
| 7,590,086 | B2 | 9/2009  | Olkkonen et al. |

(Continued)

FOREIGN PATENT DOCUMENTS

| WO | 2004/032536 | 4/2004 |
| WO | 2004/057806 | 7/2004 |

OTHER PUBLICATIONS

IEEE Standard for Information Technology—Telecommunications and information exchange between systems—Local and metropolitan area networks; Specific requirements, Part 11: Wireless LAN Medium Access Control (MAC) and Physical Layer (PHY) Specifications: Amendment: Medium Acecss Control (MAC) Quality of Service (Qos) Enhancements, IEEE 802.11e/D13.0; p. 43, lines 11-17; pp. 60-61; p. 67, paragraph 8.5.5.1; pp. 117-121; pp. 148-150; p. 152, paragraph 11.7.5; Jan. 2005.

(Continued)

*Primary Examiner* — Mahendra Patel
(74) *Attorney, Agent, or Firm* — Volpe and Koenig, P.C.

(57) ABSTRACT

A method and system for performing peer-to-peer wireless communication between stations (STAs) within a basic service set (BSS) while maintaining connectivity with an access point (AP) in the BSS are disclosed. A source STA, an AP and a destination STA negotiate a direct link setup (DLS) channel for performing peer-to-peer communication between the source STA and the destination STA. The DLS channel may be different from a BSS channel used for communication between the AP and each of the STAs. The source STA and the destination STA then perform peer-to-peer communication on the negotiated DLS channel.

12 Claims, 1 Drawing Sheet

U.S. PATENT DOCUMENTS

| | | | |
|---|---|---|---|
| 8,077,683 B2 * | 12/2011 | Rudolf et al. | 370/338 |
| 2002/0085719 A1 | 7/2002 | Crosbie | |
| 2002/0133534 A1 * | 9/2002 | Forslow | 709/200 |
| 2002/0163933 A1 * | 11/2002 | Benveniste | 370/465 |
| 2003/0054850 A1 | 3/2003 | Masseroni et al. | |
| 2003/0142652 A1 | 7/2003 | Ting et al. | |
| 2003/0174682 A1 | 9/2003 | Barker et al. | |
| 2003/0220765 A1 * | 11/2003 | Overy et al. | 702/158 |
| 2003/0231608 A1 * | 12/2003 | Wentink | 370/338 |
| 2004/0004951 A1 | 1/2004 | Zuniga et al. | |
| 2004/0103278 A1 | 5/2004 | Abhishek et al. | |
| 2004/0121766 A1 | 6/2004 | Benson et al. | |
| 2004/0127214 A1 | 7/2004 | Reddy et al. | |
| 2004/0133690 A1 * | 7/2004 | Chauffour et al. | 709/229 |
| 2004/0233888 A1 | 11/2004 | Bonta et al. | |
| 2005/0025182 A1 | 2/2005 | Nazari | |
| 2005/0036469 A1 * | 2/2005 | Wentink | 370/338 |
| 2005/0052998 A1 | 3/2005 | Oliver et al. | |
| 2005/0053015 A1 * | 3/2005 | Jin et al. | 370/254 |
| 2005/0088980 A1 | 4/2005 | Olkkonen et al. | |
| 2005/0226183 A1 * | 10/2005 | Penumetsa | 370/329 |
| 2005/0254449 A1 | 11/2005 | Halfmann et al. | |
| 2006/0020797 A1 * | 1/2006 | Zhang et al. | 713/169 |
| 2006/0165035 A1 | 7/2006 | Chandra et al. | |
| 2006/0168343 A1 * | 7/2006 | Ma et al. | 709/245 |
| 2006/0239275 A1 | 10/2006 | Zlateff et al. | |
| 2007/0076648 A1 * | 4/2007 | Yong | 370/328 |
| 2007/0097934 A1 | 5/2007 | Walker et al. | |
| 2007/0233840 A1 | 10/2007 | Alstrup et al. | |
| 2008/0305744 A1 | 12/2008 | Furuskar et al. | |
| 2009/0310578 A1 * | 12/2009 | Convertino et al. | 370/338 |

OTHER PUBLICATIONS

IEEE Standard for Information Technology—Telecommunications and information exchange between systems—Local and metropolitan area networks; Specific requirements, Part 11: Wireless LAN Medium Access Control (MAC) and Physical Layer (PHY) Specifications: Amendment: Medium Access Control (MAC) Quality of Service (Qos) Enhancements, IEEE 802.11e/D13.0; p. 43, lines 11-17; pp. 60-61; p. 67, paragraph 8.5.5.1; pp. 117-121; pp. 148-150; p. 152, paragraph 11.7.5; Jan. 2005.

* cited by examiner

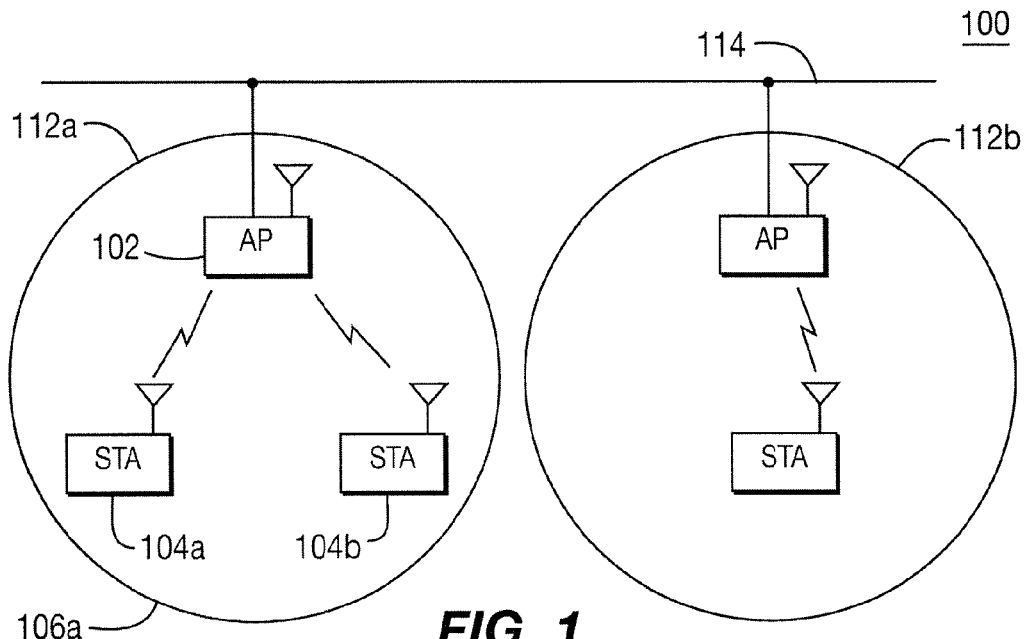
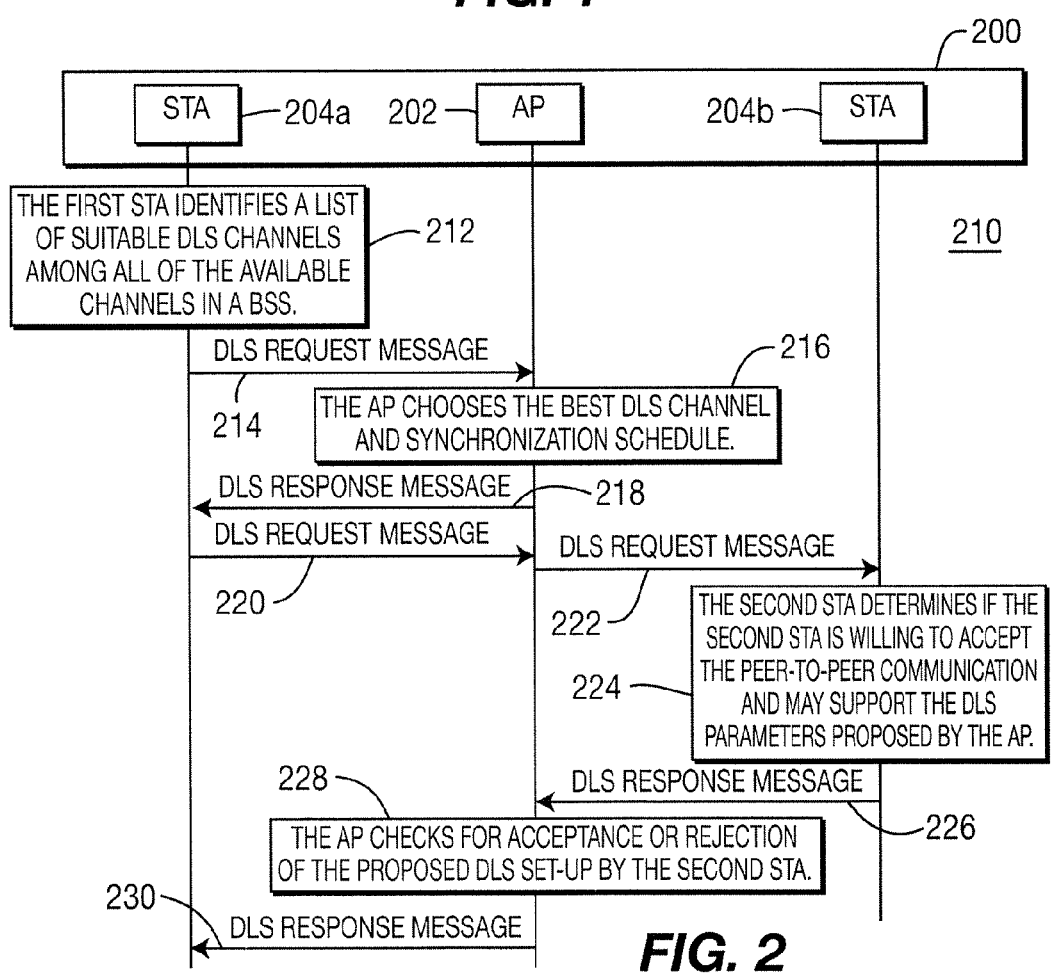
FIG. 1
FIG. 2

METHOD AND SYSTEM FOR PERFORMING PEER-TO-PEER COMMUNICATION BETWEEN STATIONS WITHIN A BASIC SERVICE SET

CROSS REFERENCE TO RELATED APPLICATION

This application is a continuation of U.S. patent Ser. No. 11/554,772, filed Oct. 31, 2006 now U.S. Pat. No. 8,077,683 which issued on Dec. 13, 2011, which claims the benefit of U.S. Provisional Application No. 60/733,217 filed Nov. 3, 2005, which is incorporated by reference as if fully set forth.

FIELD OF INVENTION

The present invention is related to a wireless communication system. More particularly, the present invention is related to a method and system for performing peer-to-peer wireless communication between stations (STAs) within a basic service set (BSS) while maintaining connectivity with an access point (AP) in the BSS.

BACKGROUND

There are two different types of wireless local area network (WLAN). One is an infrastructure mode WLAN which includes an AP and a STA, and the other is an ad hoc mode WLAN which includes only peer STAs. The ad hoc mode WLAN is also called an independent BSS (IBSS).

FIG. 1 shows a conventional infrastructure mode WLAN 100 including two BSSs 112a, 112b which are connected via a distribution system (DS) 114. The BSSs are served by APs 102a, 102b, respectively. In the infrastructure mode WLAN 100, all packets generated by a source STA, such as STA 104a, is first sent to the AP 102a. If the packets are destined outside the BSS 112a, the AP 102a forwards the packets through the DS 114. If the packets are destined to another STA, such as STA 102b, inside the BSS 112a, the AP 102a, after receiving the packets from the source STA 104a, forwards the packets over the air interface to the destination STA 104b in the BSS 112a. Therefore, the same packets are sent twice over the air.

Duplicating such peer-to-peer traffic, (i.e., sending the packets sent from one STA in the BSS to another STA in the same BSS), is an inefficient usage of the wireless medium since any peer-to-peer STA traffic within the BSS requires twice as much bandwidth compared to traffic to or from a STA outside the BSS.

In order to solve this problem, the IEEE 802.11e provides a feature called direct link setup (DLS). With the IEEE 802.11e DLS, a STA first initiates a direct link through the AP and exchanges packets with other STA directly. However, in an IEEE 802.11-based WLAN, STAs within a BSS share the same frequency channel, (i.e., BSS channel), to communicate with each other, and all traffic, (both traffic between a STA and an AP and traffic between STAs), must still be sent over the BSS channel. With this limitation to a single BSS channel, the amount of peer-to-peer traffic in a BSS that can be supported by a single frequency channel is limited by the overall throughput of the BSS. For example, a conventional IEEE 802.11g or 802.11a BSS will not be able to support more than 30-32 spore Mbps at the medium access control (MAC) level (corresponding to a net data rate of 54 Mbps at the physical layer) aggregate throughput.

Furthermore, it is difficult to manage peer-to-peer links in a conventional IEEE 802-11e DLS system. For conventional BSS traffic, (i.e., traffic between STAs and AP), the overall BSS radio range, (where packets can be reliably received), is essentially determined by the AP's radio range. An interference range of the BSS, (where packets cannot be reliably received, but will still create interference to other STAs operating on the same channel), is determined by both the STA's range and the AP's range. However, with DLS, depending on the position of the participating STAs, the interference range associated by a pair of STAs can be quite different to the interference range of the AP. Interaction and impacts of these different interference ranges is complex and has been shown to have large negative effects on network capacity in IEEE 802.11 systems.

Moreover, with conventional IEEE 802.11 systems, peer-to-peer traffic cannot be off-loaded to a different channel than the BSS channel without the involved peer-to-peer STAs losing layer 2 connectivity to the network. Trading off layer 2 connectivity for capacity is not necessarily an attractive alternative, because many of the devices in a WLAN environment need IP connectivity to support various services. For example, a TV receiving a video playback from a DVD player could not download online DVD info, titles, recommendations, or the like during playback. Losing layer 2 connectivity to the AP implies losing the possibility of supporting all services except the on-going peer-to-peer services.

Therefore, it is desirable to provide a method and system for peer-to-peer wireless communication between STAs within the BSS while maintaining layer 2 connectivity and manageability with an AP in the BSS.

SUMMARY

The present invention is related to a method and system for performing peer-to-peer wireless communication between STAs in the same BSS while maintaining layer 2 connectivity and manageability with an AP in the BSS. A source STA, an AP and a destination STA negotiate a DLS channel for performing peer-to-peer communication between the source STA and the destination STA. The DLS channel may be different from a BSS channel used for communication between the AP and each of the STAs. The source STA and the destination STA then perform peer-to-peer communication on the negotiated DLS channel. The peer-to-peer traffic is offloaded to a different channel, (i.e., DLS channel), than the BSS channel while still ensuring layer 2 connectivity from the AP to the STAs.

BRIEF DESCRIPTION OF THE DRAWINGS

FIG. 1 shows a conventional infrastructure mode WLAN.
FIG. 2 shows a signaling diagram of a DLS setup procedure in a wireless communication system including an AP, a first STA and a second STA in accordance with the present invention.

DETAILED DESCRIPTION OF THE PREFERRED EMBODIMENTS

When referred to hereafter, the terminology "STA" includes but is not limited to a user equipment (UE), a wireless transmit/receive unit (WTRU), a fixed or mobile subscriber unit, a pager, or any other type of device capable of operating in a wireless environment. When referred to hereafter, the terminology "AP" includes but is not limited to a base station, a Node-B, a site controller, or any other type of interfacing device in a wireless environment.

The features of the present invention may be incorporated into an integrated circuit (IC) or be configured in a circuit comprising a multitude of interconnecting components.

When referred to hereinafter, the terminology "BSS channel" refers to the channel used by the AP in the BSS to communicate with its associated STAs and the terminology "DLS channel" refers to the channel that are used by the STAs for their peer-to-peer communication. In the conventional WLAN system, (including IEEE 802-11e DLS system), the BSS channel is same as the DLS channel. In accordance with the present invention, the BSS channel may be different from the DLS channel and there may be multiple DLS channels in the BSS. Alternatively, more than one particular pair of STAs may use one DLS channel.

In accordance with the present invention, a pair of STAs and an AP negotiate a DLS channel for peer-to-peer communication between the STAs. Once the DLS channel is negotiated, the STAs perform peer-to-peer communication on the negotiated DLS channel. The STAs communicate with each other directly via the negotiated DLS channel while maintaining their BSS association with the AP at all times. Layer 2 connectivity between the AP and each of the STAs is ensured so that the AP retains full control over the STAs.

FIG. 2 shows a signaling diagram of a DLS setup process 210 in a wireless communication system 200 including an AP 202, a first STA 204a and a second STA 204b in accordance with the present invention. The first STA 204a identifies a list of suitable DLS channels among all of the available channels in a BSS (step 212). The list of suitable DLS channels may be identified in many different ways as described hereinafter.

The list of suitable DLS channels may be stored in a database of the first STA 204a semi-statically. The database may be management information base (MIB). Alternatively, the list of suitable DLS channels may be set by the user manually using a user interface, such as hypertext markup language (HTML), extended markup language (XML) or equivalent user interfaces. Alternatively, the list of suitable DLS channels may be set by a network management entity remotely by using a communication protocol, such as simple network management protocol (SNMP), XML, a layer 3 (or higher) protocol, or a layer 2 protocol, (e.g., by using a layer 2 management frame).

The STA 204a, 204b may be configured to check, on a regular or triggered basis, for updates of the suitable DLS channels and related parameters contained in the STA's database. Alternatively, the STA 204a, 204b may be configured to check, on a regular or triggered basis, for updates of the list of suitable DLS channels and related parameters in a remote database.

Alternatively, the first STA 204a may generate the list by observing and evaluating the channels in the BSS. The first STA 204a observes and evaluates the channels available in the BSS based on predetermined criteria including, but not limited to, channel occupancy, interference levels or activity by other STAs on each of the channels. The first STA 204a then generates the list based on the evaluation of the channels. The first STA 204a may use dual-radios to observe and evaluate the channels. Alternatively, the first STA 204a may use non-transmission time periods on the BSS channel to evaluate other channels or use clear-to-send (CTS)-to-self and equivalent mechanisms to obtain measurement periods without interrupting its ongoing transmissions on the BSS channel.

Alternatively, the first STA 204a may determine the list of suitable DLS channels by randomly selecting channel(s) among the possible channels in the BSS.

Alternatively, the first STA 204a may obtain the list of suitable DLS channels from the AP 202. The AP 202 manages at least one DLS channel and administers policies in the BSS. The AP 202 generates a list of suitable DLS channels by using any methods described hereinbefore and sends the list containing one or more suitable DLS channels to be used in the BSS to the STAs 204a, 204b. Optionally, the list may include preference values for each or a set of entries in the list. The list of suitable DLS channels in the BSS may be signaled as part of a beacon frame, a probe response frame, an association response frame or any other frame. The frame may be a management frame, an action frame, a control frame, a data frame, or any other type of frame. The list may be sent to STAs 204a, 204b either by broadcasting/multicasting or by unicasting. Preferably, the first STA 204a obtains the list from the AP 202 during an association procedure or by soliciting the AP 202 to send the list.

In addition to the list of DLS channels, the AP 202 may send configuration information regarding multi-channel DLS policy in the BSS. The configuration information includes, but is not limited to, multi-channel DLS capability implemented in the BSS, multi-channel DLS capability enabled in the BSS and dwell times, maximum transmission times, channel access times, quality of service (QoS) settings, channel access schedules for one or more DLS channels.

The first STA 204a then sends a DLS request message to an AP 202 to initiate a DLP setup by negotiating for the DLS channel with the AP 202 and the second STA 204b (step 214). The DLS request message includes the list of suitable DLS channels proposed by the first STA 204a for a peer-to-peer communication with the second STA 204b. The list of suitable DLS channels may include a preference among the DLS channels included in the list. The preference may be indicated implicitly by the order of the channels in the list. The DLS request message may also include a switch time indicating a start time for the peer-to-peer communication on a negotiated DLS channel. The DLS request message may be used in extension with the conventional IEEE 802.11e DLS request message. In such case, the list of parameters is to be understood as an extension compared to the conventional IEEE 802.11e DLS messages.

Upon reception of the DLS request message from the first STA 204a, the AP 202 chooses the best DLS channel and synchronization schedule (step 216). The AP 202 may select the best DLS channel among the channels proposed by the first STA 204a, or may reject all the channels proposed by the first STA 204a. Alternatively, the AP 202 may maintain its own list of suitable DLS channels and compare its own list to the list proposed by the first STA 204a to select the best DLS channel. The AP 202 may observe and evaluate the channels available in the BSS based on predetermined criteria including, but not limited to, channel occupancy, interference levels or activity by STAs on each of the channels. Alternatively, the AP 202 may select the DLS channel based on pre-configuration. The AP 202 may use other information, (e.g., capability information), obtained from the first STA 204a and the second STA 204b to select the best DLS channel.

If the AP 202 selects the best DLS channel from the list proposed by the first STA 204a, the process 210 proceeds to step 222. If the AP 202 rejects the DLS channels proposed by the first STA 204a, the AP 202 sends a DLS response message to the first STA 204a (step 218). The DLS response message may include a list of DLS channels proposed by the AP 202. The DLS response message may include an alternative switch time suggested by the AP 202 in the switch time suggested by the first STA 204a is not acceptable. The DLS response message may include a synchronization schedule indicating a time schedule for the first STA 204a and the second STA 204b to switch back from the DLS channel to the BSS channel for the purpose of BSS connectivity once the DLS is setup. The DLS response message may also include the reason for the rejection.

Upon receipt of the DLS response message indicating an alternative suggestions by the AP 202 for any of the DLS parameters, (i.e., DLS channels, switch time), the first STA 204*a* may accept the DLS parameters proposed by the AP 202 or may terminate the DLS setup procedure. If the first STA 204*a* chooses to accept the alternative DLS parameters proposed by the AP 202, the first STA 204*a* replies to the AP 202 using another DLS request which includes the accepted DLS parameters (step 220).

Upon receipt of the second DLS request message including the accepted DLS parameters, (which have been suggested by the AP 202), or when the AP 202 accepts the original DLS request at step 216, the AP 202 sends a DLS request message to the second STA 204*b* (step 222). The DLS request message includes at least one of the best DLS channel selected by the AP 202, a switch time selected by the AP 202, and a synchronization schedule for the first STA 204*a* and the second STA 204*b* to switch back from the DLS channel to the BSS channel for the purpose of BSS connectivity once the DLS is setup.

The synchronization schedule may be provided by time intervals (or time periods) linked to the beacon intervals, (e.g., switch back every N beacons), a dwell time (or time periods) on the BSS channel, (e.g., remain on the BSS channel for M time units), or transmission schedule for the DLS channel, (e.g., start time, end time and transmission periods describing which time intervals the first STA and the second STA may spend on the DLS channel and which time intervals the first STA and the second STA must return to the BSS channel).

Upon receipt of the DLS request, the second STA 204*b* determines if the second STA 204*b* is willing to accept the peer-to-peer communication and may support the DLS parameters proposed by the AP 202 (step 224). The second STA 204*b* then sends a DLS response message indicating either acceptance or rejection to the AP 202 (step 226).

If the second STA 204*b* rejects the peer-to-peer communication request or any of the proposed DLS parameters, the second STA 204*b* sends a DLS response message indicating rejection to the AP 202. Optionally, the second STA 204*b* may specify the cause of the rejection. Alternatively, the second STA 204*b* may send suggestions for any of DLS setup parameters. If the second STA 204*b* accepts the proposed DLS parameters, the second STA 204*b* sends a DLS response message indicating acceptance to the AP 202.

Upon reception of the DLS response from the second STA 204*b*, the AP 202 checks for acceptance or rejection of the proposed DLS set-up by the second STA 204*b* and sends a DLS response message to the first STA 204*a* (steps 228, 230). If the second STA 204*b* rejected the DLS set-up, the AP 202 sends a DLS response message indicating rejection to the first STA 204*a*. Optionally, the AP 202 may forward the reason for rejection or alternative suggestions made by the second STA 204*b*. Upon reception of the DLS response message indicating rejection, the procedure 200 terminates. The first STA 204*a* may re-initiate the DLS setup procedure 200 by returning to step 212.

If the second STA 204*b* accepted the DLS set-up, the AP 202 sends a DLS response message indicating acceptance to the first STA 204*a*. The first STA 204*a* and the second STA 204*b* then execute the key exchange procedure according to IEEE 802.11i, switch to the negotiated DLS channel at the specified channel switch time, and return to the BSS channel at the time periods (or time intervals) as specified in the synchronization schedule.

In accordance with another embodiment of the present invention, instead of initiating a procedure for setting up a DLS link via the DLS channel, the first STA 204*a* and the second STA 204*b* may first establish a DLS link via a conventional BSS channel. Once the first STA 204*a* and the second STA 204*b* have setup a DLS link on the BSS channel, one of the STAs 204*a*, 204*b* may request the other STA for switch to a DLS channel. Once the first STA 204*a* and the second STA 204*b* agree on a DLS channel, one of them notifies the AP 202, which may agree or not. Once the AP 202 agrees on the switch of the channel, the first STA 204*a* and the second STA 204*b* perform a peer-to-peer communication via the negotiated DLS channel.

In selecting the best DLS channel, the AP 202 may implement different decision policies regarding its preference of the DLS channels to be used. For example, the AP 202 may allocate each new requested DLS link to a different DLS channel, or allocate a subsequently requested DLS link to a DLS channel that is already allocated for another pair of STAs.

The DLS channel may be a sub-channel of the BSS channel. For example, with a 40 MHz bandwidth BSS channel, STAs may choose to set-up a DLS channel with a 20 MHz bandwidth similar to the IEEE 802.11n legacy support mode.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for performing peer-to-peer wireless communication between a first station (STA) and a second STA in a basic service set (BSS), the method comprising:
   the first STA establishing a direct link with the second STA on a first channel, wherein messages for setting up the direct link are exchanged between the first STA and the second STA through an access point (AP) of the BSS, wherein both the first STA and the second STA are associated with the AP;
   the first STA negotiating with the second STA to switch the direct link to a second channel, wherein messages for switching the direct link to the second channel are exchanged directly between the first STA and the second STA via the direct link on the first channel without being relayed through the AP; and
   the first STA exchanging data with the second STA via the direct link on the second channel, wherein the first STA switches back and forth between the first channel and the second channel in accordance with a schedule agreed with the second STA for maintaining connectivity with the AP while performing peer-to-peer communication on the second channel.

2. The method of claim 1 wherein a request message for switching the channel indicates a switch time for switching the direct link to the second channel.

3. The method of claim 1 wherein a request message for switching the channel includes a list of at least one target channel.

4. The method of claim 3 wherein the list is generated by evaluating channels available in the BSS.

5. The method of claim 1 wherein the second channel is a sub-channel of the first channel.

6. The method of claim 1 further comprising the first STA executing a key exchange procedure with the second STA for security.

7. A station (STA) for performing peer-to-peer wireless communication with a peer STA in a basic service set (BSS), the STA comprising:
- a transceiver configured to transmit a first message to an access point (AP) to establish a direct link with a peer STA on a first channel, to transmit a second message to the peer STA via the direct link on the first channel to negotiate with the peer STA to switch the direct link to a second channel, to exchange data with the peer STA via the direct link on the second channel, and to switch back and forth between the first channel and the second channel in accordance with a schedule agreed with the peer STA for maintaining connectivity with the AP while performing peer-to-peer communication on the second channel.

8. The STA of claim 7 wherein the transceiver is configured to send a request message indicating a switch time for switching the direct link to the second channel.

9. The STA of claim 7 wherein the second message includes a list of at least one target channel.

10. The STA of claim 9 further comprising:
- a controller configured to generate the list by evaluating channels available in the BSS.

11. The STA of claim 7 wherein the second channel is a sub-channel of the first channel.

12. The STA of claim 7 wherein the STA is configured to execute a key exchange procedure with the peer STA for security.

* * * * *